(12) United States Patent
Parker et al.

(10) Patent No.: US 8,789,081 B2
(45) Date of Patent: Jul. 22, 2014

(54) VIDEO QUALITY SCORING

(75) Inventors: Benjamin J. Parker, Vacaville, CA (US); Brian W. Joe, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 403 days.

(21) Appl. No.: 13/224,592

(22) Filed: Sep. 2, 2011

(65) Prior Publication Data

US 2013/0057705 A1   Mar. 7, 2013

(51) Int. Cl.
*H04N 7/16* (2011.01)
*H04N 21/647* (2011.01)
*H04N 21/238* (2011.01)
*H04N 21/239* (2011.01)
*H04N 21/262* (2011.01)

(52) U.S. Cl.
CPC .......... *H04N 21/647* (2013.01); *H04N 21/238* (2013.01); *H04N 21/239* (2013.01); *H04N 21/26216* (2013.01)
USPC ................... 725/9; 725/12; 725/10; 725/107; 348/184; 348/E17.001

(58) Field of Classification Search
CPC . H04N 21/647; H04N 21/238; H04N 21/239; H04N 21/26216
USPC .......... 725/107, 9, 12, 10; 348/184, E17.001
See application file for complete search history.

(56) References Cited

U.S. PATENT DOCUMENTS

| | | | |
|---|---|---|---|
| 5,434,890 A * | 7/1995 | Kimura et al. | 375/365 |
| 2007/0130585 A1* | 6/2007 | Perret et al. | 725/46 |
| 2010/0058409 A1* | 3/2010 | Chapman et al. | 725/106 |
| 2012/0206610 A1* | 8/2012 | Wang et al. | 348/184 |
| 2012/0206611 A1* | 8/2012 | Boyes et al. | 348/184 |
| 2012/0297433 A1* | 11/2012 | Lindegren et al. | 725/107 |

* cited by examiner

*Primary Examiner* — Pankaj Kumar
*Assistant Examiner* — Sahar Baig

(57) ABSTRACT

A network device may be configured to receive video quality data that includes information corresponding to a delivery of video content from a content source to a user device via a network and information corresponding to video presentation conditions corresponding to the user device. The network device may also be configured to determine video quality metrics based on the video quality data. Each of the video quality metrics may correspond to a characteristic of the delivery of the video content from the content source to the user device or the video presentation conditions corresponding to the user device. The network device may also be configured to determine, based on the video quality metrics, a video quality score that corresponds to an estimated user viewing experience corresponding to the video content. The network device may also be configured to communicate the video quality score to an operator of the network.

20 Claims, 9 Drawing Sheets

| TRANSCODER | RAN MODELER | CLIENT APPLICATION |
|---|---|---|
| CONTENT URL<br>FORMAT WIDTH<br>FORMAT HEIGHT<br>FRAME RATE<br>DURATION<br>TRANSCODER START TIME<br>TRANSCODER RUN TIME<br>VIDEO DURATION<br>INPUT FILE WAIT TIME<br>RAW ENCODING TIME<br>VIDEO FRAMES<br>VIDEO BYTES<br>AUDIO FRAMES<br>AUDIO BYTES<br>TOTAL BYTES<br>SOURCE FILE | NETWORK CONGESTION DATA | INTERNET PROTOCOL ADDRESS<br>CLIENT VERSION<br>OPERATOR<br>DEVICE TYPE<br>RESULT CODE<br>EXIT CODE<br>FRAME RATE MEAN<br>FRAME RATE STANDARD DEVIATION<br>BANDWIDTH MEAN<br>BANDWIDTH STANDARD DEVIATION<br>JITTER MEAN<br>JITTER STANDARD DEVIATION<br>ORIGINAL FILE FORMAT<br>ORIGINAL VIDEO CODEC<br>ORIGINAL AUDIO CODEC<br>ORIGINAL WIDTH<br>ORIGINAL HEIGHT<br>ORIGINAL BYTES TRANSCODED<br>ORIGINAL AVERAGE BIT RATE<br>ORIGINAL VIDEO FRAME RATE<br>OUTPUT AVERAGE VIDEO FRAME RATE<br>OVERALL COMPRESSION RATE |
| VIDEO ID CONTROLLER | | |
| VIDEO METADATA<br>GENRE<br>CODEC<br>VIEWING TIME | | |
| OPTIMIZATION SYSTEM | | |
| TOTAL BYTES DELIVERED<br>TOTAL VIDEOS DELIVERED<br>TOTAL VIDEO BYTES | | |

FIG. 7

VIDEO QUALITY METRICS

| | | | | |
|---|---|---|---|---|
| Jitter | >10ms | <10ms | <5ms | 0 |
| Video Start Delay | >5 Sec | 3 to 5 Sec | 1 to 3 Sec | <1 Sec |
| Frame Rate (Frames Per Second) | 1 to 7 | 8 to 14 | 15 to 19 | 20 to 30 |
| Congestion Detected | High | Medium | Low | None |
| Video Stall Detected | Severe | Significant | Mild | None |
| Output File Size (% or Original) | <39% | 40% to 59% | 60% to 74% | >75% |
| Original Width | <39% | 40% to 59% | 60% to 74% | >75% |
| Original Height | <39% | 40% to 59% | 60% to 74% | >75% |
| Original Average Bit Rate | <39% | 40% to 59% | 60% to 74% | >75% |
| Video Delivery (% of Title View Time) | <39% | 40% to 59% | 60% to 74% | >75% |
| INDIVIDUAL METRIC SCORES | 1 | 2 | 3 | 4 |

VIDEO QUALITY REPORT

TITLE: THE PRINCESS BRIDE
VIEWING START TIME: 7:10 PM
VIEWING END TIME: 8:52 PM
VIEWING DATE: OCT. 12, 2010
CORE NETWORK ID: 123456
ACCESS NETWORK ID: ABCDE

| VIDEO QUALITY METRICS | MEASURED | SCORE |
|---|---|---|
| 1. Jitter | 4 ms | 3 |
| 2. Video Start Delay | 3 Sec | 2 |
| 3. Frame Rate | 26 FPS | 4 |
| 4. Congestion Detected | Low | 3 |
| 5. Video Stall Detected | Mild | 3 |
| 6. Output File Size (% or Original) | 68% | 3 |
| 7. Original Width | 72% | 3 |
| 8. Original Height | 72% | 3 |
| 9. Original Average Bit Rate | 64% | 3 |

| TOTAL SCORE: | 29 |
|---|---|
| NUMBER OF METRICS: | 9 |
| VIDEO QUALITY SCORE: | 3.2 |

VIDEO QUALITY SCORING

BACKGROUND

Currently available network technologies include the ability to deliver video content to user devices over wireless networks. However, these currently available technologies do not provide adequate solutions for assessing the level of quality of the video content being delivered.

BRIEF DESCRIPTION OF THE DRAWINGS

FIG. 6 is a diagram of example video quality data that may be collected by content delivery subsystems (CDSs) according to one or more implementations described herein;

FIG. 7 is a diagram of an example of a table of video quality metrics according to one or more implementations described herein;

FIG. 8 is a diagram of an example video quality report according to one or more implementations described herein.

DETAILED DESCRIPTION OF PREFERRED EMBODIMENTS

The following detailed description refers to the accompanying drawings. The same reference numbers in different drawings may identify the same or similar elements.

Figure 1:
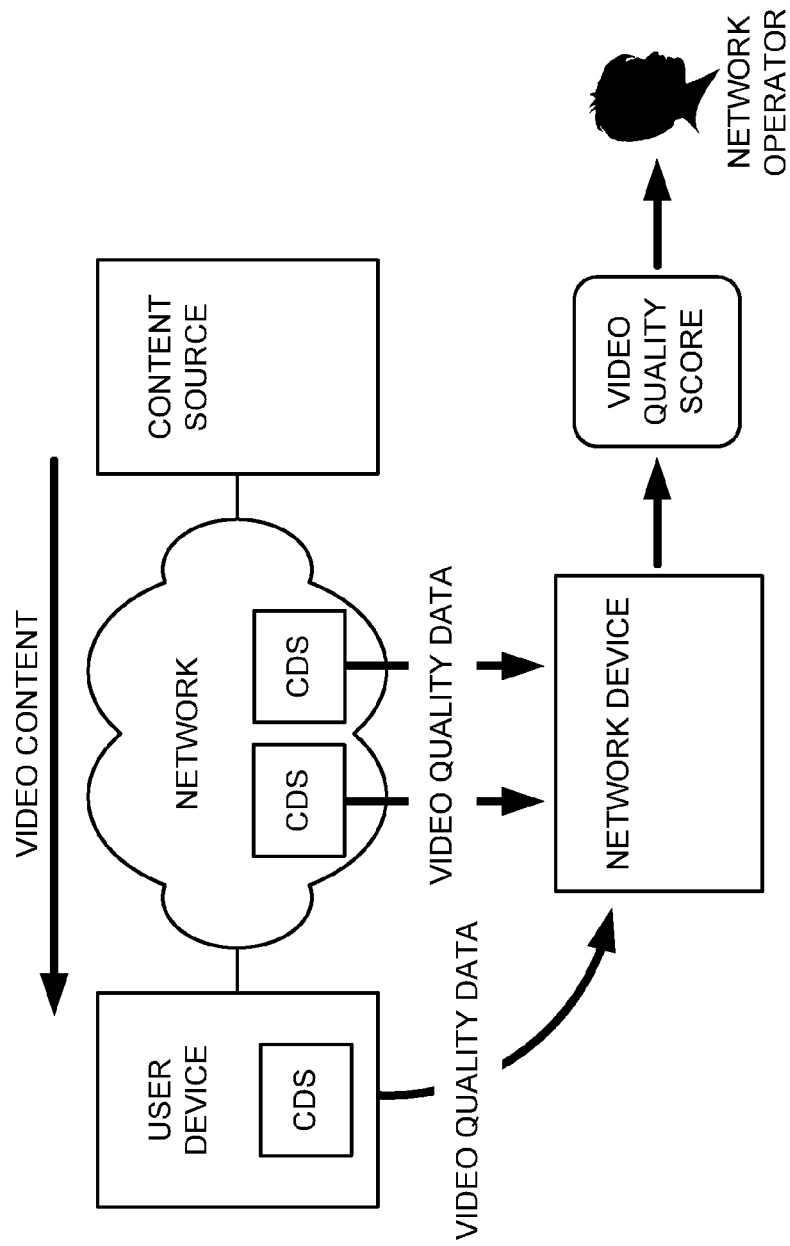
FIG. 1 is a diagram of an overview of an implementation described herein.

FIG. 1 is a diagram of an overview of one or more implementations described herein. As depicted, a content source may communicate video content to a user device via a network. Content delivery subsystems (CDSs) in the network and/or the user device may communicate video quality data, corresponding to the video content, to a network device. Video quality data may include a variety of information, such as information corresponding to the video content, information corresponding to network conditions, and/or information corresponding to the user device displaying the video content.

The network device may use the video quality data to generate video quality metrics. Video quality metrics may include a variety of metrics, such as metrics corresponding to the video content, metrics corresponding to network conditions, and/or metrics corresponding to the user device displaying the video content.

The network device may use the video quality metrics to generate a video quality score, and the video quality score may be sent to a network operator. The video quality score may represent an estimated user viewing experience corresponding to the video content delivered to the user device. In some implementations, the video quality score may be included in a video quality report that includes additional information, such as information regarding the network, information regarding the video content, the video quality data used to generate the video quality metrics, or the video quality metrics.

Since the video quality score may represent, or provide a measure of, an estimated user viewing experience, communicating the video quality score to the network operator may inform the network operator about whether the network is operating properly and/or whether a user of the user device is experiencing a high-quality video viewing experience. In addition, the video quality score may provide evidence that a network is capable of consistently providing high-quality video content to users. Such evidence may, for example, enable the network operator to charge a higher premium to users and content providers for access to the network. Also, since a video quality report may include information in addition to the video quality score, communicating the video quality report to the network operator may better inform the network operator regarding the operating conditions of certain aspects of the network, the video content, the user device, etc.

Figure 2:
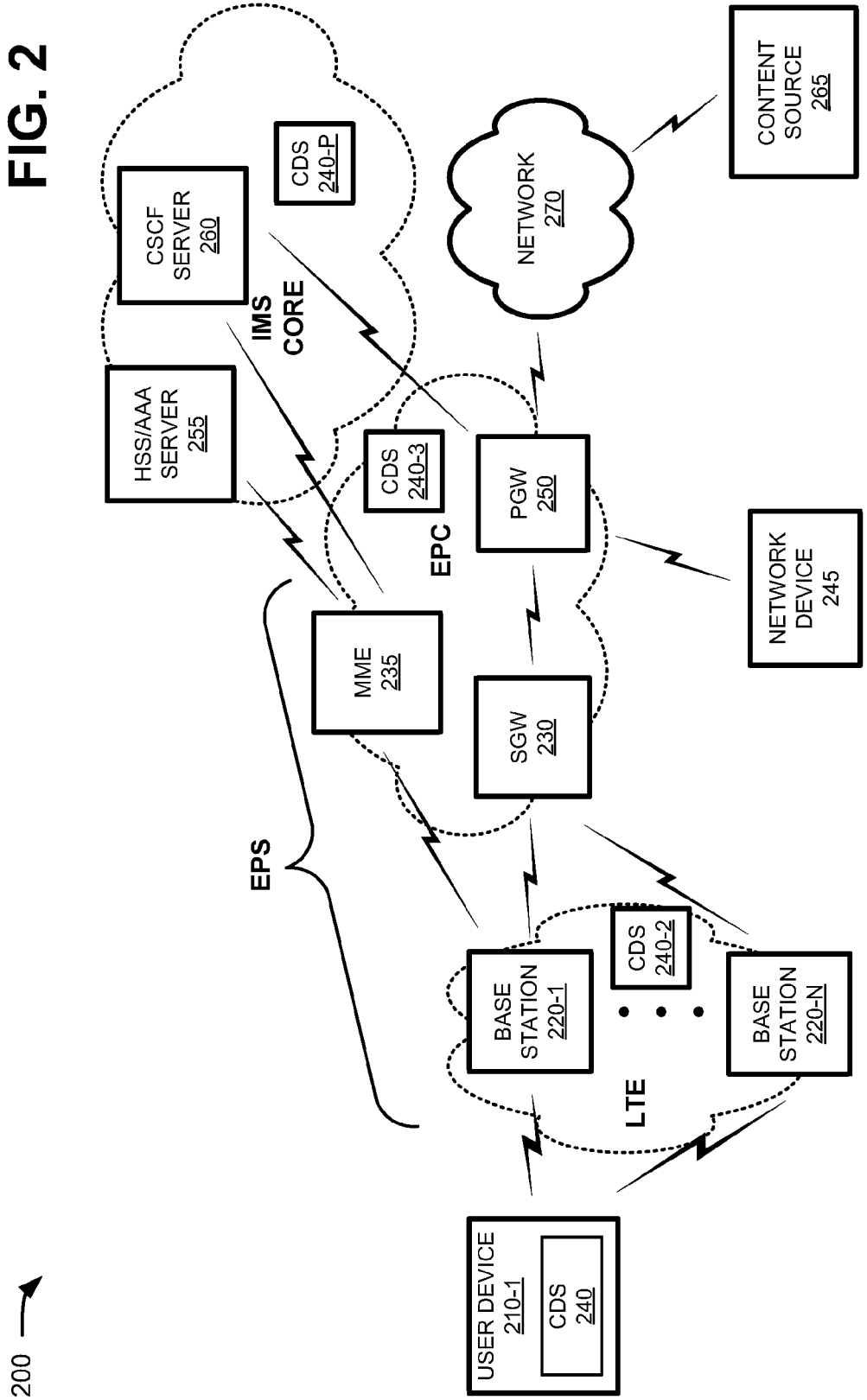
FIG. 2 is a diagram that illustrates an example environment in which systems and/or methods, described herein, may be implemented.

FIG. 2 is a diagram of an example environment 200 in which systems and/or methods described herein may be implemented. As shown in FIG. 2, environment 200 may include a user device 210, a group of base stations 220-1, . . . , 220-N (where N≥1) (hereinafter referred to collectively as "base stations 220" and individually as "base station 220"), a serving gateway 230 (hereinafter referred to as "SGW 230"), a mobility management entity device 235 (hereinafter referred to as "MME 235"), CDSs 240-1, 240-2, 240-3, . . . , 240-P (where P≥1) (hereinafter referred to collectively as "CDSs 240," and individually as "CDS 240"), a network device 245, a packet data network (PDN) gateway (PGW) 250, a home subscriber server (HSS)/authentication, authorization, accounting (AAA) server 255 (hereinafter referred to as an "HSS/AAA server 255"), a call session control function (CSCF) server 260 (hereinafter referred to as "CSCF server 260"), a content source 265, and a network 270. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Implementations are described as being performed within a RAN that is based on a long term evolution (LTE) network for explanatory purposes. In other implementations, the implementations may be performed within a RAN that is not based on a LTE network.

Environment 200 may include an evolved packet system (EPS) that includes a LTE network and/or an evolved packet core (EPC) that operate based on a third generation partnership project (3GPP) wireless communication standard. The LTE network may be a RAN that includes one or more base stations 220 that take the form of evolved Node Bs (eNBs) via which user device 210 communicates with the EPC. The EPC may include SGW 230, MME 235, and/or PGW 250 that enable user device 210 to communicate with network 270 and/or an Internet protocol (IP) multimedia subsystem (IMS) core. The IMS core may include HSS/AAA server 255 and/or CSCF server 260 and may manage authentication, session initiation, account information, profile information, etc. associated with user devices 210.

User device 210 may include any computation or communication device, such as a wireless mobile communication device that is capable of communicating with base station 220 and/or a network (e.g., network 270). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 210 may send traffic to and/or receive traffic from network 270.

Base station 220 may include one or more devices that receive, process, and/or transmit traffic, such as audio, video, text, and/or other data, destined for and/or received from user device 210. In an example implementation, base station 220 may be an eNB associated with the LTE network that receives traffic from and/or sends traffic to network 270 via SGW 230 and PGW 250. Base station 220 may send traffic to and/or receive traffic from user device 210 via an air interface. In another example, one or more other base stations 220 may be associated with a radio access network (RAN) that is not associated with the LTE network.

SGW 230 may include one or more computation or communication devices that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 230 may aggregate traffic received from one or more base stations 220 associated with the LTE network, and may send the aggregated traffic to network 270 (e.g., via PGW 250) and/or other network devices associated with the IMS core and/or the EPC. SGW 230 may also receive traffic from the other network devices and/or may send the received traffic to user device 210 via base station 220. SGW 230 may perform operations associated with handing off user device 210 from and/or to the LTE network.

MME 235 may include one or more computation or communication devices that gather, process, search, store, and/or provide information in a manner described herein. For example, MME 235 may perform operations associated with handing off user device 210, from a first base station 220 to a second base station 220, when user device 210 is exiting a cell associated with the first base station 220. MME 235 may, in yet another example, perform an operation to handoff user device 210 from the second base station 220 to the first base station 220 when user device 210 is entering the cell associated with first base station 220.

CDS 240 may include one or more computation or communication devices that gather, process, search, store, and/or provide information in a manner described herein. As depicted, environment 200 may include one or more CDSs 240 located in one or more networks or devices. Examples of CDS 240 may include a transcoder, a RAN modeler, a video ID controller, an optimization system, or another type of system or device capable of operating in environment 200. In some implementations, CDS 240 may also, or alternatively, include one or more client applications executed by user device 210.

A transcoder may include one or more of a variety of computing and/or communication devices, such as a server, a cluster of servers, or one or more other types of computing or communication devices. A transcoder may be capable of converting data (e.g., a video file, an audio file, etc.) from one format to another format. For example, a transcoder may receive video content in a non-compressed format from content source 265, and the transcoder may convert the video content to a compressed format that may be more compatiable with streaming high-quality video content to user device 210. In another example, the transcoder may convert video content from a format that is incompatible with user device 210 to another format that is compatible with user device 210. In some implementations, the transcoder may communicate video quality data, such as a format width, a format height, a frame rate, a video duration, etc., to network device 245.

A RAN modeler may include one or more of a variety of computing and/or communication devices, such as a server, a cluster of servers, or one or more other types of computing or communication devices. A RAN modeler may be capable of monitoring network congestion corresponding to one or more base stations 220, an EPS, and/or an IMS core. In some implemenations, the RAN modeler may communicate video quality data, such as network congestion data, to network device 245.

A video ID controller may include one or more of a variety of computing and/or communication devices, such as a server, a cluster of servers, or one or more other types of computing or communication devices. A video ID controller may provide services regarding the delivery of video content. For example, a video ID controller may provide adaptive bit rate (ABR) services (e.g., providing video content to user device 210 at a rate consistent with the available bandwidth and/or processing capacity corresponding to user device 210). A video ID controller may also, or alternatively, provide ABR control services that may include only showing certain video content (e.g., video content that cannot be adapted content) when a particular bit rate is available or particular network conditions are detected. A video ID controller may also, or alternatively, obtain video content metadata corresponding to video content, such as a title, a genre, a codec, and/or one or more other types of data corresponding to video content, and communicate the video content metadata to network device 245.

An optimization system may detect network conditions corresponding to the LTE network, the EPS network, and/or the IMS core network, and optimize video content delivery by modifying the manner in which video content flows through the LTE network, the EPS network, and/or the IMS core network. For instance, an optimization system may detect network conditions by measuring network congestion (e.g., queuing delay, packet loss, connection blocking, etc.), latency (e.g., the amount of time required for data to travel between network nodes), jitter (e.g., the variability of latency over a period of time), transmission control protocol (TCP) windowing, or by measuring one or more other types of network conditions. Depending on the scenario, an optimization system may optimize the delivery of video content by, for example, controlling TCP windowing, regulating port queues, managing port buffers, and/or executing one or more other types of optimization techniques regarding the LTE network, the EPS network, and/or the IMS core network. An optimization system may also, or alternatively, provide services relating to TCP termination and re-initiation. In some implementations, an optimization system may collect video quality data, such as a total quantity of bytes delivered to user device 210 or a total quantity of video delivered to user device 210, and communicate the video quality data to network device 245.

Client application, in terms of CDS 240, may include one or more types of software executed by user device 210. For example, client application may include an interface button, a textbox, an image, a video, a toolbar, or another type of user interface object. In some implementations, client application may include a shim, an interface plug-in, or another type of software capable of gathering, processing, searching, storing, evaluating, receiving, and/or providing data or other types of information as described herein. For example, client application may collect video quality data, such as an operator identity, a device type, a frame rate mean, a frame rate standard deviation, etc., and communicate the video quality data to network device 245.

Network device 245 may include one or more of a variety of computing and/or communication devices, such as a server, a cluster of servers, or one or more other types of computing or communication devices. Network device 245 may be capable of receiving video quality data from CDSs 240 (e.g., a transcoder, a RAN modeler, a video ID controller, an optimization system, etc.), and generating video quality scores that represent an estimated user viewing experience corresponding to video content delivered to user device 210. In some implementations, network device 245 may use the video quality data to generate one or more video quality metrics, and use the video quality metrics to generate the video quality score. Network device 245 may also perform a variety of additional operations discussed throughout this description, such as creating a video quality report that includes a video quality score and one more other types of information, such as video content metadata (e.g., information about the video content provided to user device 210), video quality data received from one or more CDSs 240, etc.

PGW 250 may include one or more computation or communication devices that gather, process, search, store, and/or provide information in a manner described herein. PGW 240 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 250 may include a device that aggregates traffic received from one or more SGWs 230, etc. and may send the aggregated traffic to network 270. In another example implementation, PGW 250 may receive traffic from network 270 and may send the traffic toward user device 210 via SGW 230.

HSS/AAA server 255 may include one or more server devices, or other types of computation or communication devices, that gather, process, search, store, and/or provide information in a manner described herein. For example, HSS/AAA server 255 may manage, update, and/or store, in a memory associated with HSS/AAA server 255, profile information associated with user device 210 that identifies applications and/or services that are permitted for and/or accessible by user device 210, information associated with a user of user device 210 (e.g., a username, a password, a personal identification number (PIN), etc.), rate information, minutes allowed, and/or other information. Additionally, or alternatively, HSS/AAA server 255 may include a device that performs authentication, authorization, and/or accounting (AAA) operations associated with a communication session with user device 210.

CSCF server 260 may include one or more server devices, or other types of computation or communication devices, that gather, process, search, store, and/or provide information in a manner described herein. CSCF server 260 may process and/or route calls to and from user device 210 via the EPC. For example, CSCF server 260 may process calls, received from network 270, that are destined for user device 210. In another example, CSCF server 260 may process calls, received from user device 210, that are destined for network 270.

Content source 265 may include any type or form of content source. For example, content source 265 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content sources (e.g., YouTube, Vimeo, Netflix, Hulu, Veoh, etc.) that stream content from web sites and/or permit content to be downloaded (e.g., via progressive download, etc.). Content source 265 may include on-demand content sources (e.g., video on demand (VOD) providers, pay per view (PPV) providers, etc.). Video content, as used herein, may refer to a stream of content that includes video content (e.g., a video stream), audio content (e.g., an audio stream), and/or textual content (e.g., a textual stream).

Network 270 may include one or more wired and/or wireless networks. For example, network 270 may include a cellular network, a public land mobile network (PLMN), a second generation (2G) network, a 3G network, a 4G network, a fifth generation (5G) network, and/or another network. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

While implementations herein are described primarily in the context of broadband services via LTE, other wireless standards may be used. For example, components conforming to LTE standards described herein may be replaced by components conforming to other network standards (e.g., GSM, WCDMA, UMB, UMTS, CDMA2000, HSPA, 802.11, or other network standards).

Figure 3:
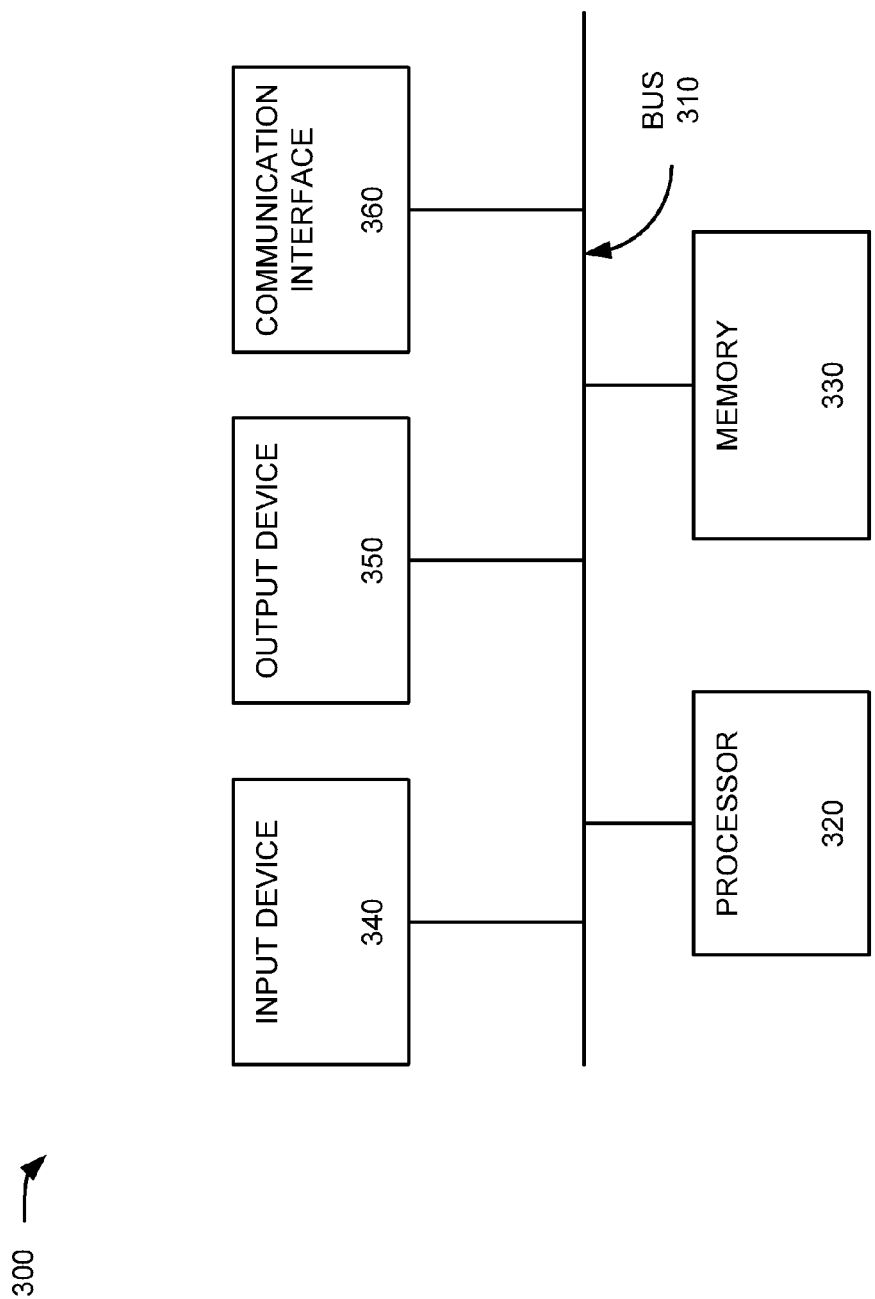
FIG. 3 is a diagram of example components of one or more devices that may be used within the environment of FIG. 2.

FIG. 3 is a diagram of example components of device 300 that may be used within environment of FIG. 2. For example, device 300 may correspond to user device 210, SGW 230, MME 235, CDS 240, network device 245, PGW 250, HSS/AAA server 255, CSCF server 260, and/or content source 265. Each of user device 210, SGW 230, MME 235, CDS 240, network device 245, PGW 250, HSS/AAA server 255, CSCF server 260, and/or content source 265 may include one or more devices 300 and/or one or more of the components of device 300.

As depicted, device 300 includes bus 310, processing unit 320, memory 330, input device 340, output device 350, and communication interface 360. However, the precise components of device 300 may vary between implementations. For example, depending on the implementation, device 300 may include fewer components, additional components, different components, or differently arranged components than those illustrated in FIG. 3.

Bus 310 may permit communication among the components of device 300. Processing unit 320 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processing unit 320 may control the overall operation, or a portion thereof, of device 300, based on, for example, an operating system (not illustrated) and/or various applications. Processing unit 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processing unit 320 executing software instructions contained in a computer-readable medium, such as memory 330. The software instructions may be read into memory 330 from another computer-readable medium or from another device via communication interface 360. The software instructions contained in memory 330 may cause processing unit 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
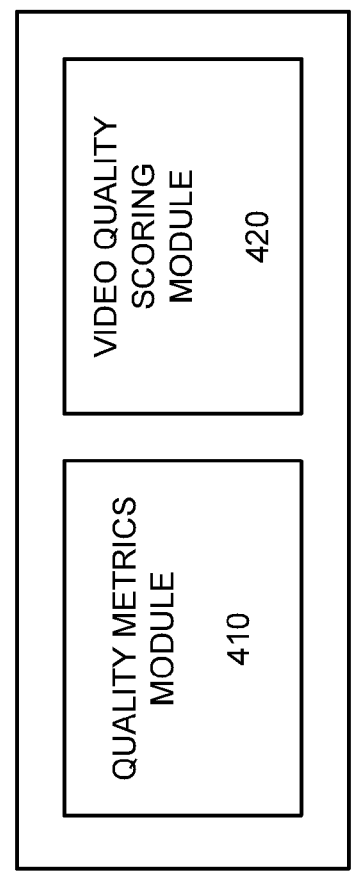
FIG. 4 is a diagram of example functional components of a network device according to one or more implementations described herein.

FIG. 4 is a diagram of example functional components of network device 245. As illustrated, network device 245 may include quality metrics module 410 and video quality scoring module 420. Depending on the implementation, one or more of modules 410-420 may be implemented as a combination of hardware and software based on the components illustrated and described with respect to FIG. 3. Alternatively, modules 410-420 may each be implemented as hardware based on the components illustrated and described with respect to FIG. 3.

Quality metrics module 410 may provide functionality with respect to determining video quality metrics. For example, quality metrics module 410 may enable network device 245 to receive video quality data from CDSs 240. As mentioned above, the video quality data may include information corresponding to the delivery of video content from content source 265 to user device 210, and information regarding video viewing, or video presentation, conditions corresponding to user device 210. Quality metrics module 410 may also, or alternatively, enable network device 245 to ascertain video quality metrics based on the video quality data received from CDSs 240.

Video quality scoring module 420 may provide functionality with respect to video quality scores. For example, video quality scoring module 420 may enable network device 245 to generate a video quality score for video content based on the video quality metrics determined by quality metrics module 410. Video quality scoring module 420 may also, or alternatively, enable network device 245 to produce a video quality report that may include the video quality score. As mentioned above, the video quality report may also include other types of information, such as video quality data, video quality metrics, or other types of information.

In addition to the functionality described above, modules 410-420 may also, or alternatively, provide functionality as described elsewhere in this specification. While FIG. 4 shows a particular number and arrangement of modules, in alternative implementations, modules 410-420 may include additional modules, fewer modules, different modules, or differently arranged modules than those depicted.

Figure 5:
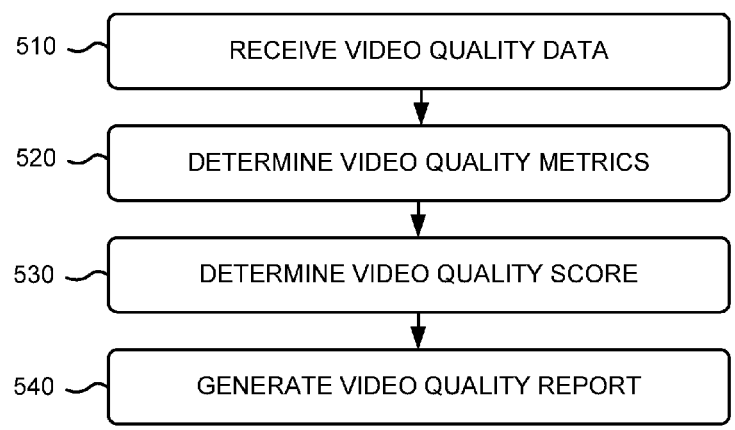
FIG. 5 is a diagram of an example process for video scoring according to one or more implementations described herein.

FIG. 5 is a diagram of an example process 500 for video quality scoring according to one or more implementations described herein. In one or more implementations, process 500 may be performed by one or more components of network device 245. In other implementations, one or more blocks of process 500 may be performed by one or more other components/devices, or a group of components/devices, including or excluding network device 245.

Video quality data may be received (block 510). For instance, network device 245 may receive video qualtiy data from one or more CDSs 240. As mentioned above, examples of CDSs 240 may include a transcoder, a RAN modeler, a video ID controller, an optimization system, and/or client application. Examples of the types of video quality data that may be received from each of the foregoing CDSs 240 is discussed below with reference to FIG. 6.

Video quality metrics may be determined (block 520). For instance, network device 245 may quantify one or more aspects of the manner in which the video content was delivered to user device 210. As mentioned above, examples of video quality metrics may include an average jitter rate, an average frame rate, an average level of network congestion, and one or more other types of metrics. Additional examples of video quality metrics are discussed below with reference to FIG. 7.

A video quality score may be generated (block 530). For example, network device 245 may calculate a video quality score based on one or more video quality metrics. As mentioned above, the video quality score may represent a measure of the user's viewing experience. The manner in network device 245 generates the video quality score may vary between implementations. For instance, in some implementations, network device 245 may generate the video quality score by determining an individual quality score for each of the video quality metrics and calculating an average of the individual scores assigned to each of the video quality metrics. However, in other implementations, network device 245 may, for example, give greater weight to certain types of video quality metrics and/or only use certain video quality metrics when certain video quality metrics are unavailable. Network device 245 may also, or alternatively, use any number, variety, or combination or mathematical tools, statistical tools, one or more other types of logical tools for generating the video quality score.

A video quality report may be created (block 540). For example, network device 245 may create a report that includes information regarding the manner in which video content was delivered to user device 210. The video quality report may include the video quality score and a variety of additional information, such as a title of the video content, date and time information, and/or one or more other types of information that may relate to the delivery of video content to user device 210. Additional examples of information that may be included in a video quality report are discussed below with reference to FIG. 8.

While FIG. 5 shows a flowchart diagram of an example process 500 for video quality scoring, in other implementations, a process for video quality scoring may include fewer operations, different operations, differently arranged operations, or additional operations than depicted in FIG. 5. For instance, an additional process for video quality scoring is discussed below with reference to FIG. 9.

FIG. 6 is a diagram of example video quality data that may be collected by CDSs 240 according to one or more implementations described herein. As depicted, in this example, CDSs 240 may include a transcoder, a RAN modeler, a video ID controller, an optimization system, and client application. While the functionality of transcoders, RAN modelers, video ID controllers, optimization systems, and client application (in terms of CDSs 240) are discussed above with reference to FIG. 2, FIG. 6 depicts video quality data that may correspond to each CDS 240.

For example, the video quality data received by network device 245 from a transcoder may include, for particular video content, a content uniform resource locator (URL) from which the particular video content is available, a format width of the particular video content, a format height of the particular video content, a frame rate of the particular video content, a video duration of the particular video content, a transcoder start time of the particular video content, a transcoder run time of the particular video content, a video duration of the particular video content, an input file wait time of the particular video content, a raw encoding time of the particular video content, a video quantity of video frames of the particular video content, a quantity of video bytes of the particular video content, quantity of audio frames of the particular video content, a quantity of audio bytes of the particular video content, total quantity of bytes of the particular video content, a source file of the particular video content, and/or one or more of the other types of video quality data.

Additionally or alternatively, the video quality data received by network device 245, for particular video content, may include network congestion data from a RAN modeler. Additionally, or alternatively, the video quality data received by network device 245 from a video ID controller, for particular video content, may include video metadata (e.g., a video title, a video release date, etc.) of the particular video content, genre information of the particular video content, codec information of the particular video content, or viewing time information of the particular video content. The video quality data received by network device 245 from an optimization system, for particular video content, may include a total quantity of bytes delivered, a total quantity of videos delivered, or a total quantity of video bytes delivered.

Additionally or alternatively, the video quality data received by network device 245 by a client application, for particular video content, may include an IP address of the particular user device, version information of the client application, operator information corresponding to the user device, a device type corresponding to the user device, a result code for the particular video content, an exit code for the particular video content, a frame rate mean for the particular video content, a frame rate standard deviation for the particular video content, a bandwidth mean for the particular video content, a band width standard deviation for the particular video content, a jitter mean for the particular video content, a jitter standard deviation for the particular video content, an original file format for the particular video content, an original audio codec for the particular video content, an original width for the particular video content, an original height for the particular video content, an original quality of bytes transcoded for the particular video content, an original average bit rate for the particular video content, an original video fram rate for the particular video content, an output average video frame rate for the particular video content, or an overall compression rate for the particular video content.

While FIG. 6 provides several examples of video quality data that may be received from CDSs 240, other implementations may include additional video content data and/or CDSs 240, fewer video content data and/or CDSs 240, or alternative video content data and/or CDSs 240 than the examples provided in FIG. 6.

FIG. 7 is a diagram of an example of a data structure 700 storing video quality metrics according to one or more implementations described herein. As mentioned previously, network device 245 may ascertain video quality metrics based on video quality data received from CDSs 240. Network device 245 may also, or alternatively, determine an individual score for each video quality metric.

Data structure 700 may represent a system for scoring video quality metrics. As described above, the individual metric scores may be used to determine a video quality score corresponding to particular video content.

For example, a jitter time between 5 milliseconds and 10 milliseconds may be assigned an individual metric score of 2, and a frame rate of 15 frames per second may be assigned an individual metric score of 3. In another example, a high degree of network congestion may be assigned an individual metric score of 1, and a mild video stall (e.g., a video start delay of less than 1 second) may be assigned an individual metric score of 3. Accordingly, table 700 of FIG. 7 provides examples of video quality metrics and individual metrics scores that may be assigned to each video quality metric.

Further, as demonstrated by FIG. 7, implementations discussed herein may include a wide variety of video quality metrics that may be expressed quantitatively (e.g., in milliseconds, in frames per second, etc.) and/or qualitatively (e.g., low, medium, high, etc.). As discussed below in FIG. 8, the individual metric scores may be used to determine an overall video quality score. While FIG. 7 provides several examples of video quality metrics that may be ascertained from video quality data received from CDSs 240, other implementations may include additional video content metrics, fewer video content metrics, or alternative video content metrics than depicted in FIG. 7.

FIG. 8 is a diagram of a video quality report 800 according to one or more implementations discussed herein. As discussed above, video quality report 800 may be generated, or otherwise produced, by network device 245. In some implementations, a video quality report may, for example, inform network operators regarding a level of quality corresponding to video content delivered to user device 210.

As illustrated, video quality report 800 may include video metadata, such as a video title, a start time, an end time, and a viewing date. Video quality report 800 may also, or alternatively, include network information, such as a core network identifier (ID) and an access network identifier (ID) that correspond, respectively, to a core network and an access network used to deliver the video content to user device 210. Video quality report 800 may also, or alternatively, include one or more video quality metrics with corresponding metric scores. Additionally, or alternatively, video quality report 800 may include other types of information, such as a sum of the individual metric scores, the quantity of the video quality metrics presented in video quality report 800, and a video quality score. As represented in the example of FIG. 8, the video quality score may be an average of the individual metric scores presented in video quality report 800.

While FIG. 8 provides an example of information that may be included in video quality report 800, other implementations may include additional information, less information, or alternative information than depicted in FIG. 8.

Figure 9:
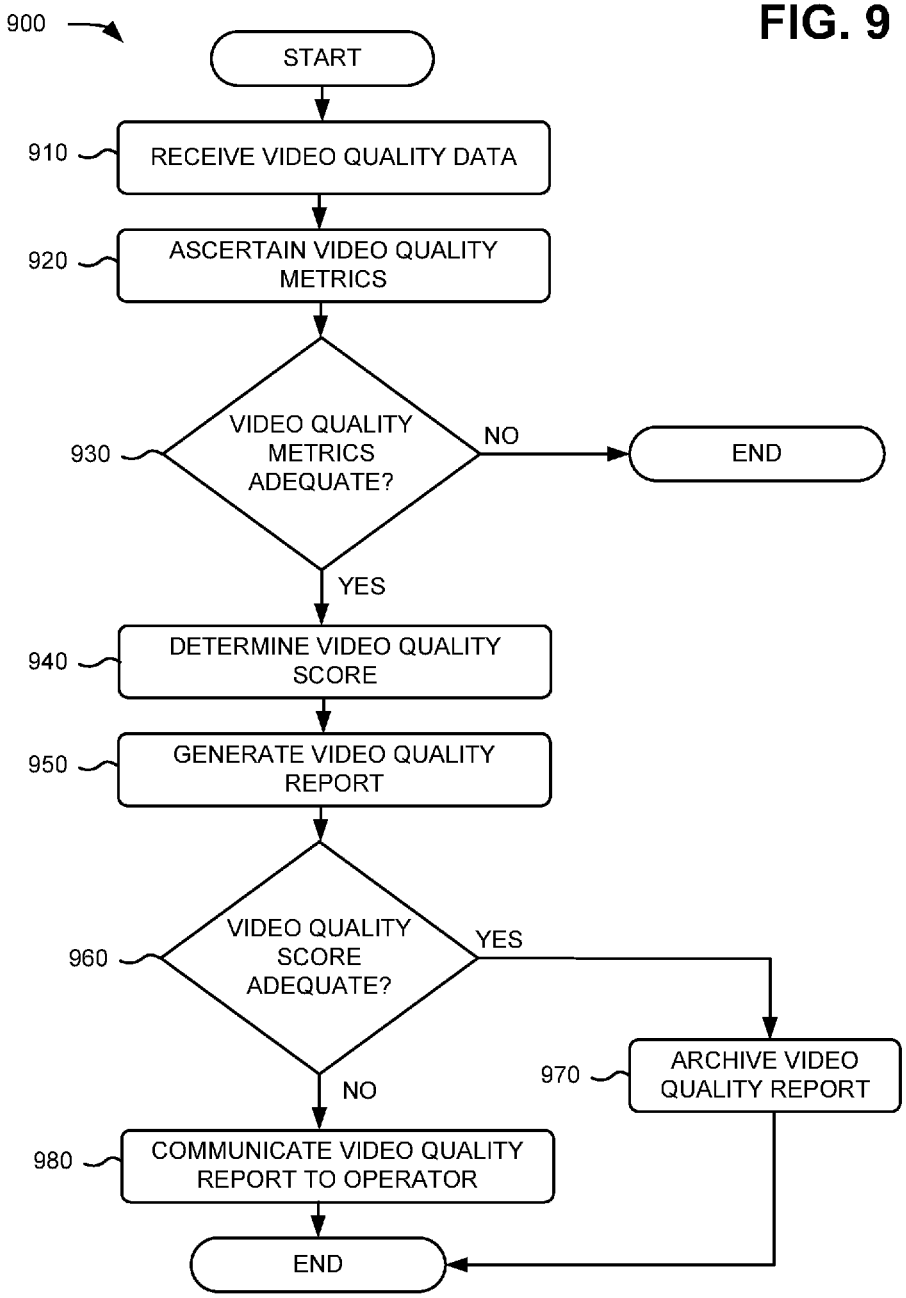
FIG. 9 is a diagram of another example process for video quality scoring according to one or more implementations described herein.

FIG. 9 is a diagram of an example process 900 for video quality scoring according to one or more implementations described herein. In one or more implementations, process 900 may be performed by one or more components of network device 245. In other implementations, one or more blocks of process 900 may be performed by one or more other components/devices, or a group of components/devices, including or excluding network device 245.

Process 900 may include receiving video quality data (block 910) and ascertaining video quality metrics (block 920). For example, as discussed above with reference to FIG. 5, network device 245 may receive video delivery data from one or more CDSs 240. Additionally, or alternatively, network device 245 may ascertain one or more video quality metrics based on the video quality data. Examples of video quality data and video quality metrics are provided above with reference to FIGS. 6-7.

A determination may be made whether the video quality metrics are adequate (block 930). For example, network device 245 may identify the quantity of video quality metrics ascertained and determine whether the quantity of video quality metrics is greater than, or equal to, a particular quantity of video quality metrics required to determine a video quality score. In some implementations, this may be a simple comparison of the number of video quality metrics ascertained and the minimum number required. However, other implementations, this may include additional considerations, such as the types of video quality metrics ascertained, the video quality data supporting one or more of the video quality metrics, or another consideration regarding the video quality metrics. For instance, in some implementations, regardless of the quantity of video quality metrics ascertained, the video quality metrics may be inadequate unless the corresponding video content was viewed by the user for at least some specified amount of time. Additionally, or alternatively, if a particular video quality metric, such as a jitter mean or a jitter standard deviation, is not ascertainable, then a video quality score might not be determined.

A video quality score may be determined (block 940), and a video quality report may be generated (block 950). For example, as described above with reference to FIG. 5, network device 245 may determine a video quality score based on one or more video quality metrics and generate a video quality report that associates the video quality score with the corresponding video content. An example of a video quality score and a video quality report is discussed above with reference to FIG. 8.

A determination may be made whether the video quality score is adequate (block 960). For example, network device 245 may determine whether the video quality score exceeds a video quality score threshold. The video quality report may be archived if the video quality score is adequate (block 970). For example, in some implementations, network device 245 may store the video quality report in a data storage device in order to permit a network operator to later search for, and/or access, the video quality report for analysis. In some implementations, the video quality report may be communicated to a network operator if the video quality score is inadequate (block 980). In some implementations, this may enable the network operator to be notified of video delivery problems in a network, and, in turn, enable the network operator to promptly address video delivery problems in order to ensure a high-quality video delivery services.

While FIG. 9 shows a flowchart diagram of an example process 900 for video quality scoring, in other implementations, a process for video quality scoring may include fewer operations, different operations, differently arranged operations, or additional operations than depicted in FIG. 9.

Accordingly, in one or more implementations, described herein, devices may be used to evaluate a user viewing experience corresponding to video content delivered to user device 210. For example, network device 245 may receive video quality data from CDSs 240 corresponding to a network. Video quality data may include information regarding the delivery of video content from content source 265 to user device 210. Video quality data 600 may also, or alternatively, include video viewing, or video presentation, conditions corresponding to user device 210.

Network device 245 may ascertain video quality metrics based on the video quality data, and determine, based on the video quality metrics, a video quality score representing an estimated user viewing experience corresponding to the video content. Network device 245 may generate video quality report 800 that includes the video quality score and identification information corresponding to the delivery of the video content from content source 265 to user device 210. Video quality report 800 may enable an operator of a network to determine whether a portion of the network corresponding to user device 210 and/or CDSs 240 is operating in accordance with one or more network performance guidelines, standards, or expectations.

While described in terms of video, one or more of the implementations described above may apply to other types of media content as well, such as audio and/or a combination of audio and visual media.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" or "module" that performs one or more functions. These components or modules may include hardware, such as an ASIC or a FPGA, or a combination of hardware and software.

Even though particular combinations of features are recited in the claims and/or disclosed in the specification, these combinations are not intended to limit the possible implementations. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a network device, video quality data comprising information corresponding to a delivery of video content from a content source to a user device via a network and information corresponding to video presentation conditions corresponding to the user device;
   determining, by the network device, video quality metrics based on the video quality data, where each of the video quality metrics corresponds to a characteristic of the delivery of the video content from the content source to the user device or one of the video presentation conditions corresponding to the user device; and
   determining, by the network device and based on the video quality metrics, a video quality score, the video quality score corresponding to an estimated user viewing experience corresponding to the video content; and
   communicating the video quality score to an operator of the network.

2. The method of claim 1, further comprising:
   generating a video quality report comprising the video quality score; and
   communicating the video quality report to the operator of the network.

3. The method of claim 1, further comprising:
   prior to communicating the video quality score to the operator of the network,
      determining that the video quality score is below a video score threshold.

4. The method of claim 1, further comprising:
   prior to determining the video quality score,
      determining that a quantity of the video quality metrics exceeds a particular threshold corresponding to a required quantity of video quality metrics for determining the video quality score.

5. The method of claim 1, where:
   determining the video quality metrics comprises assigning an individual quality score to each of the video quality metrics, and
   determining the video quality score comprises determining an average of the individual quality scores.

6. The method of claim 1, where receiving the video quality data comprises:
   receiving the video quality data from at least two of:
      an optimization system to measure latency in the network;
      a radio access network modeler to measure network congestion;
      a transcoder to convert the video content from one encoded format to another encoded format;
      a video identification controller to identify a video identifier corresponding to the video content; or
      a client application to collect the information corresponding to video presentation conditions corresponding to the user device.

7. The method of claim 6, where receiving the video quality data further comprises:
   receiving, from the optimization system, information regarding a quantity of bytes delivered to the user device, a quantity of videos delivered to the user device, or a total quantity of video bytes delivered to the user device,
   receiving, from the transcoder, information regarding a format width corresponding to the video content, a format height corresponding to the video content, a frame rate corresponding to the video content, a uniform resource locator corresponding to the video content, a duration corresponding to the video content, a transcoder start time corresponding to the video content, a transcoder run time corresponding to the video content, a video duration corresponding to the video content, an input file wait time corresponding to the video content, a raw encoding time corresponding to the video content, a quantity of video frames corresponding to the video content, a quantity of video bytes corresponding to the video content, a quantity of audio frames corresponding to the video content, a quantity of audio bytes corresponding to the video content, a total quantity of bytes corresponding to the video content, or a source file corresponding to the video content,
   receiving, from the radio access network modeler, information regarding network congestion corresponding to the video content being delivered to the user device,
   receiving, from the video identification controller, information regarding a video title corresponding to the video content, a genre corresponding to the video content, a codec corresponding to the video content, or a video time corresponding to the video content, or
   receiving, from the client application, information regarding an internet protocol address corresponding to the user device, a client version corresponding to the client application, operator information corresponding to the user device, a result code corresponding to the client application, an exit code corresponding to the client application, a frame rate mean corresponding to the video content, a frame rate standard deviation corresponding to the video content, a bandwidth mean corresponding to the video content, a bandwidth standard deviation corresponding to the video content, a jitter mean corresponding to the video content, a jitter standard deviation corresponding to the video content, an original file format corresponding to the video content, an original video codec corresponding to the video content, an original audio codec corresponding to the video content, an original width corresponding to the video content, an original height corresponding to the video content, an original quantity of transcoded bytes corresponding to the video content, an original average bit rate corresponding to the video content, an original video frame rate corresponding to the video content, an output average video frame rate corresponding to the video content, or an overall compression rate corresponding to the video content.

8. The method of claim 1, where the video quality metrics comprise a jitter value corresponding to the video content, a video start delay corresponding to the video content, a frame rate corresponding to the video content, a congestion level corresponding to the video content being delivered, a video stall level corresponding to the video content, an output file size corresponding to the video content, an original width corresponding to the video content, an original height corresponding to the video content, an original average bit rate corresponding to the video content, or an amount of video content delivered corresponding to the video content.

9. A network device, comprising:
a memory to store instructions; and
a processor, connected to the memory, to:
   receive video quality data that comprises information corresponding to a delivery of video content from a content source to a user device via a network and information corresponding to video presentation conditions corresponding to the user device;
   determine video quality metrics based on the video quality data, where each of the video quality metrics corresponds to a characteristic of the delivery of the video content from the content source to the user device or the video presentation conditions corresponding to the user device;
   determine, based on the video quality metrics, a video quality score, where the video quality score represents an estimated user viewing experience corresponding to the video content;
   determine whether the video quality score is below a video score threshold; and
   when the video quality score is below the video score threshold,
      notify a network operator of the video quality score, and
   when the video quality score is not below the video score threshold,
      archive the video quality score.

10. The network device of claim 9, where the processor is to:
   generate a video quality report comprising the video quality score,
   communicate the video quality report when the video quality score is below the video score threshold, and
   archive the video quality report when the video quality score is not below the video score threshold.

11. The network device of claim 9, where the processor is to:
   verify that a quantity of video quality metrics exceeds a particular threshold prior to determining the video quality score.

12. The network device of claim 9, where:
   to ascertain the video quality metrics, the processor is to assign an individual quality score to each of the video quality metrics, and,
   to determine the video quality score, the processor is to determine an average of the individual quality scores.

13. The network device of claim 9, where, to receive the video quality data, the processor is to communicate with:
   an optimization system to measure latency in the network;
   a transcoder to convert the video content from one encoded format to another encoded format;
   a video identification controller to identify a video identifier corresponding to the video content; or
   a client application to collect the information corresponding to video presentation conditions corresponding to the user device.

14. The network device of claim 13, where to receive the video quality data, the processor is to:
   receive, from the optimization system, information regarding a quantity of bytes delivered to the user device, a quantity of videos delivered to the user device, or a total quantity of video bytes delivered to the user device,
   receive, from the transcoder, information regarding a format width corresponding to the video content, a format height corresponding to the video content, a frame rate corresponding to the video content, a uniform resource locator corresponding to the video content, a duration corresponding to the video content, a transcoder start time corresponding to the video content, a transcoder run time corresponding to the video content, a video duration corresponding to the video content, an input file wait time corresponding to the video content, a raw encoding time corresponding to the video content, a quantity of video frames corresponding to the video content, a quantity of video bytes corresponding to the video content, a quantity of audio frames corresponding to the video content, a quantity of audio bytes corresponding to the video content, a total quantity of bytes corresponding to the video content, or a source file corresponding to the video content,
   receive, from the radio access network modeler, information regarding network congestion corresponding to the video content being delivered to the user device,
   receive, from the video identification controller, information regarding a video title corresponding to the video content, a genre corresponding to the video content, a codec corresponding to the video content, or a video time corresponding to the video content, or
   receive, from the client application, information regarding an internet protocol address corresponding to the user device, a client version corresponding to the client application, operator information corresponding to the user device, a result code corresponding to the client application, an exit code corresponding to the client application, a frame rate mean corresponding to the video content, a frame rate standard deviation corresponding to the video content, a bandwidth mean corresponding to the video content, a bandwidth standard deviation corresponding to the video content, a jitter mean corresponding to the video content, a jitter standard deviation corresponding to the video content, an original file format corresponding to the video content, an original video codec corresponding to the video content, an original audio codec corresponding to the video content, an original width corresponding to the video content, an original height corresponding to the video content, an original quantity of transcoded bytes corresponding to the video content, an original average bit rate corresponding to the video content, an original video frame rate corresponding to the video content, an output average video frame rate corresponding to the video content, or an overall compression rate corresponding to the video content.

15. The network device of claim 9, where the video quality metrics comprise a jitter value corresponding to the video content, a video start delay corresponding to the video content, a frame rate corresponding to the video content, a network congestion level corresponding to the video content being delivered, a video stall level corresponding to the video content, an output file size corresponding to the video content, an original width corresponding to the video content, an original height corresponding to the video content, an original average bit rate corresponding to the video content, or an amount of video content delivered corresponding to the video content.

16. One or more non-transitory computer-readable storage media, comprising:
   one or more instructions that, when executed by a processor, cause the processor to:
      receive video quality data from a plurality of content delivery subsystems, where the video quality data comprises information corresponding to a delivery of video content from a content source to a user device via a network and information corresponding to video presentation conditions corresponding to the user device, ascertain video quality metrics based on the video quality data, where each of the video quality metrics corresponds to a characteristic of the delivery of the video content from the content source to the user device or the video presentation conditions corresponding to the user device, determine that a quantity of video quality metrics exceeds a particular threshold, and produce, based on the video quality metrics, a video quality score corresponding to an estimated user viewing experience corresponding to the video content when the quantity of video quality metrics exceed the particular threshold.

17. The one or more non-transitory computer-readable storage media of claim 16, where the one or more instructions cause the processor to:

generate a video quality report comprising the video quality score, and communicate the video quality report to an operator of the network.

18. The one or more non-transitory computer-readable storage media of claim 17, where the one or more instructions cause the processor to:

verify that the video quality score is below a video score threshold prior to communicating the video quality report to the operator of the network.

19. The one or more non-transitory computer-readable storage media of claim 16, where:

to ascertain the video quality metrics, the one or more instructions cause the processor to assign an individual quality score to each of the video quality metrics, and to produce the video quality score, the one or more instructions cause the processor to, combine the individual quality scores.

20. The one or more non-transitory computer-readable storage media of claim 16, where:

to receive the video quality data from the plurality of content delivery subsystems, the one or more instructions cause the processor to:

receive, from a transcoder, a format width corresponding to the video content, a format height corresponding to the video content, or a frame rate corresponding to the video content, receive, from a video identification controller, a video title corresponding to the video content, a genre corresponding to the video content, a codec corresponding to the video content, or a video time corresponding to the video content, receive, from an optimization system, a quantity of bytes delivered to the user device or a quantity of videos delivered to the user device, or receive, from a client application, a jitter mean, a jitter standard deviation, a frames-per-second mean, a frames-per-second standard deviation, a bandwidth mean, a bandwidth standard deviation, or an output average video frame rate.

* * * * *